(12) United States Patent
Graf

(10) Patent No.: US 6,192,423 B1
(45) Date of Patent: Feb. 20, 2001

(54) SHARING A SINGLE SERIAL PORT BETWEEN SYSTEM REMOTE ACCESS SOFTWARE AND A REMOTE MANAGEMENT MICROCONTROLLER

(75) Inventor: John D. Graf, San Jose, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/131,650

(22) Filed: Aug. 10, 1998

(51) Int. Cl.[7] .................................................... G06F 13/00
(52) U.S. Cl. .............................. 710/31; 710/32; 709/217; 709/227
(58) Field of Search ..................... 710/31–34, 14, 710/15; 709/217, 227

(56) References Cited

U.S. PATENT DOCUMENTS

| | | | |
|---|---|---|---|
| 4,100,601 | * | 7/1978 | Kaufman et al. ................ 710/32 |
| 4,493,052 | * | 1/1985 | Geiger et al. ................... 710/15 |
| 5,121,390 | * | 6/1992 | Farrell et al. ................... 370/458 |
| 5,226,173 | * | 7/1993 | Sasaki et al. .................... 712/40 |
| 5,331,574 | * | 7/1994 | Temoshenko et al. ........... 702/186 |
| 5,418,909 | * | 5/1995 | Jackowski et al. .............. 710/15 |
| 5,561,822 | * | 10/1996 | Ham ............................... 710/36 |
| 5,920,730 | * | 7/1999 | Vincent ........................... 341/22 |
| 5,920,731 | * | 7/1999 | Pletll et al. ..................... 395/834 |
| 5,938,748 | * | 8/1999 | Lynch et al. .................... 710/53 |
| 5,958,024 | * | 9/1999 | Typaldos et al. ................ 710/26 |
| 5,978,865 | * | 11/1999 | Hansen et al. .................. 710/22 |
| 5,983,290 | * | 11/1999 | Obata et al. .................... 710/38 |
| 5,999,992 | * | 12/1999 | Grohoski et al. ............... 71/29 |

OTHER PUBLICATIONS

*IBM PC Server, Advanced Systems Management Adapter Installation Instructions*, Available as part No. 05L1467 from IBM, Sep. 1997, pp. 23–27.

*Integration & Management—Remote Server Management with Integrated Remote Console*, available on the internet for Compaq, Oct. 1996.

Joe Campbell, *C Programmer's Guide to Serial Communications*, Macmillan Computer Publishing, Indiana, 1987, pp. 131–137.

\* cited by examiner

*Primary Examiner*—Dung C. Dinh
*Assistant Examiner*—Nkosi N Trim

(57) ABSTRACT

A serial port is shared by a microcontroller and a host application. The microcontroller initially responds to a remote user making connection to the serial port. Upon the remote user requesting connection to the host application, a hardware switch connects a serial port connector to serial port hardware utilized by the host application. The connection between the remote user and the host application is monitored, so that when the connection between the remote user and the host application is discontinued, the serial port connector is reconnected to the microcontroller.

20 Claims, 2 Drawing Sheets

SHARING A SINGLE SERIAL PORT BETWEEN SYSTEM REMOTE ACCESS SOFTWARE AND A REMOTE MANAGEMENT MICROCONTROLLER

BACKGROUND

The present invention concerns remote management of a computer system and pertains particularly to sharing a single serial port between system remote access software and a remote management microcontroller.

Network servers are increasingly being managed remotely. Management is typically performed using remote access software running on the network server. A remote user can access the remote access software through a network connection. The network connection could be, for example through a 10 Base-T or 100 Base-T connection. Alternatively, the remote user can access the remote access software running on the network server by connecting through a public telephone network to a modem which is connected to the network server.

However, when an operating system is down (i.e., the operating system is not running), it is generally not possible to utilize the remote access software. For this purpose, some network servers utilize a separate microcontroller. The microcontroller can provide the remote user with troubleshooting data and access to the server console. Once the operating system is up and running, the remote access software provides the remote user with more functionality for management of the network server.

Typically, a network server will utilize two telephone lines, each telephone line with a dedicated modem. One telephone line is used when the remote user connects to the remote access software, and the other telephone line is used with the remote user connects to the separate microcontroller. However, there can be a significant overhead cost to maintain two modems and two telephone lines for remote management.

In order to reduce this overhead, there have been attempts to design a network server so that remote access software and a separate microcontroller share a single modem and single telephone line. See for example, IBM PC Server, Advanced Systems Management Adapter Installation Instructions, Available as part Number 05L1467 from IBM, September 1997, pp. 23–27. See also, Integration & Management; Remote Server Management with Integrated Remote Console, available on the internet from Compaq, October 1996. However, these solutions have tended to be clumsy to use and/or unreliable.

BRIEF SUMMARY OF THE INVENTION

In accordance with the preferred embodiment of the present invention, a serial port is shared by a microcontroller and a host application. The microcontroller initially responds to a remote user making connection to the serial port. Upon the remote user requesting connection to the host application, a hardware switch connects a serial port connector to serial port hardware utilized by the host application. The connection between the remote user and the host application is monitored, so that when the connection between the remote user and the host application is discontinued, the serial port connector is reconnected to the microcontroller.

For example, the switching is accomplished using a multiplexer and the monitoring is performed by control logic separate from the microcontroller. In the preferred embodiment, the serial port is RS-232 compatible. The control logic monitors a data carrier detect line (DCD), a data terminal ready line (DTR) and a receive data line (RD) of the serial port to determine when the connection between the remote user and the host application is discontinued. Also in the preferred embodiment, the host application is a remote access software running on a network server.

The present invention provides for reliable sharing of a serial port. Since the switching is done in hardware, the solution presented does not hang when there are software errors.

DETAILED DESCRIPTION OF THE PREFERRED EMBODIMENT

Figure 1:
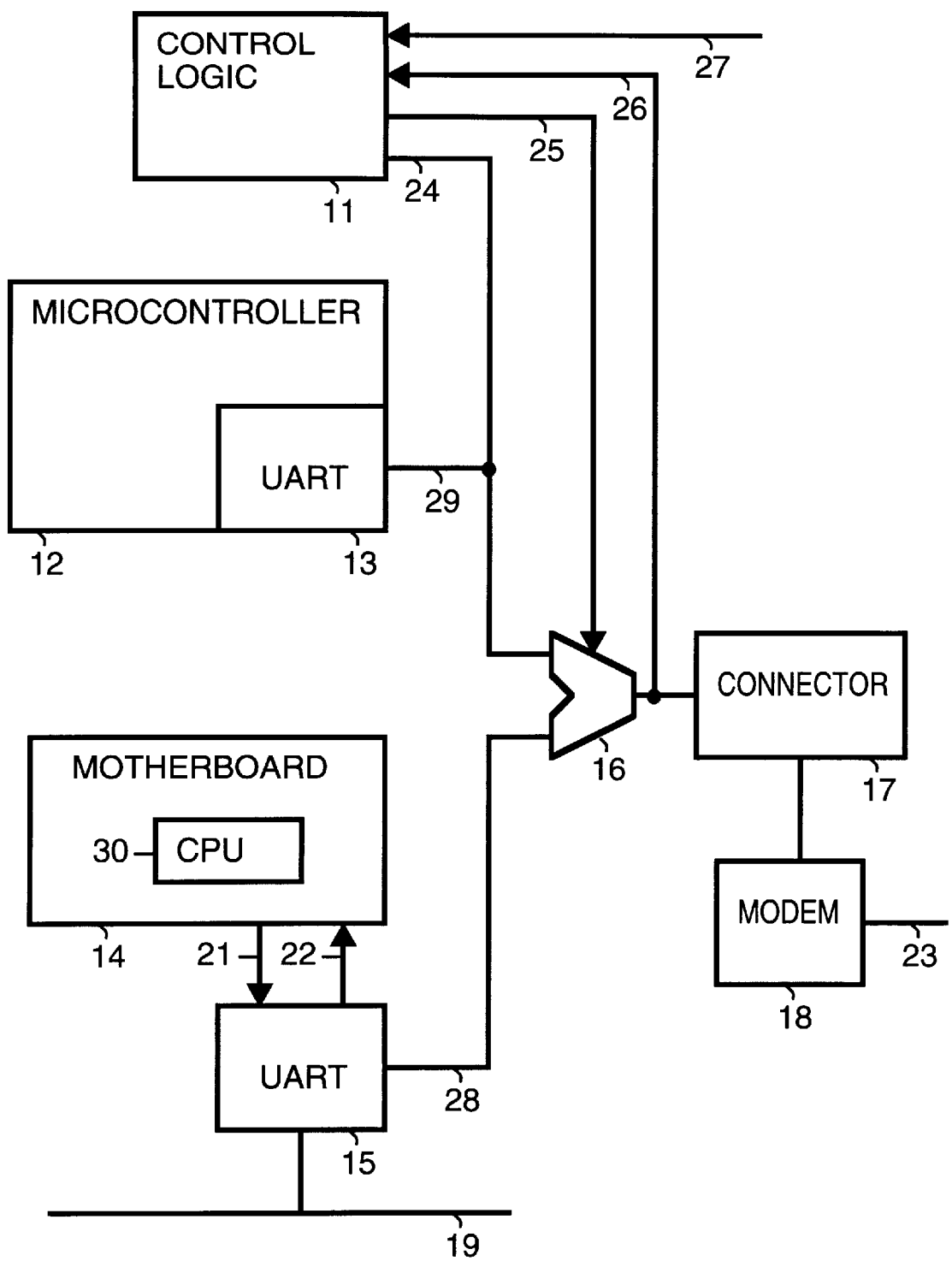
FIG. 1 is a simplified block diagram of a network server which utilizes a single serial port to provide access to either remote access software or a separate microcontroller in accordance with a preferred embodiment of the present invention.

FIG. 1 shows a network server which utilizes a single serial port connector 17 to provide access to either a host application (remote access software) or a separate microcontroller 12. The host application runs on a central processing unit (CPU) 30 within a motherboard 14. A Universal Asynchronous Receiver Transmitter (UART) 15 is used by the host application to access the serial port. UART 15 is, for example, a model number 16650 UART available from National Semiconductor, a model number 8250 UART available from National Semiconductor, or another industry standard UART. Alternatively, another type of serial port (such as USB) or other some other type of communication port could be used instead of a UART compatible serial port.

UART 15 is connected to an input/output (I/O) bus 19 of the network server. I/O bus 19 is, for example, an ISA compatible I/O bus, or some other standard I/O bus.

UART 15 uses a configurable I/O chip select 21 and an interrupt request line 22 to communicate with motherboard 14.

A microcontroller 12 includes an internal UART 13. Microcontroller 12 is, for example an 8051 family microcontroller available, for example, from Philips Semiconductors, having a business address of 811 East Arques Avenue, Sunnyvale, Calif. 94086-4523. For example, UART 13 includes at least some of the functionality of a model number 16650 UART available from National Semiconductor, a model number 8250 UART available from National Semiconductor, or another industry standard UART.

A multiplexer 16 selects either UART 13 or UART 15 to be connected to a serial port connector. For example, serial port connector is an EIA-232-D (nine signal) RS-232 connector. A modem 18 is used to provide communication between serial port connector 17 and a telephone line 23.

A control logic 11 through a multiplexer control (MUXCTL) line 25 controls the selection made by multiplexer 16. Control logic 11 monitors lines 26 from serial port connector. Lines 26 include a data carrier detect line (DCD) line 26 and a receive data (RD) line.

For more information on RS-232 circuits for asynchronous I/O on microcomputers see, for example, Joe Campbell, *C Programmer's Guide to Serial Communications*, Macmillan Computer Publishing, Indiana, 1987, pp. 131–137.

Input/output lines 28 for UART 15 include a transmitted data line (TD2), a receive data line (RD2), a ready to send line (RTS2), a data terminal ready line (DTR2) and a clear to send line (CTS2), a data set ready line (DSR2) and a data carrier detect line (DCD).

In order to appropriately switch multiplexer 16, control logic 11 monitors DTR2 through line 27, as well as DCD and RD lines 26 directly from serial port connector.

Figure 2:
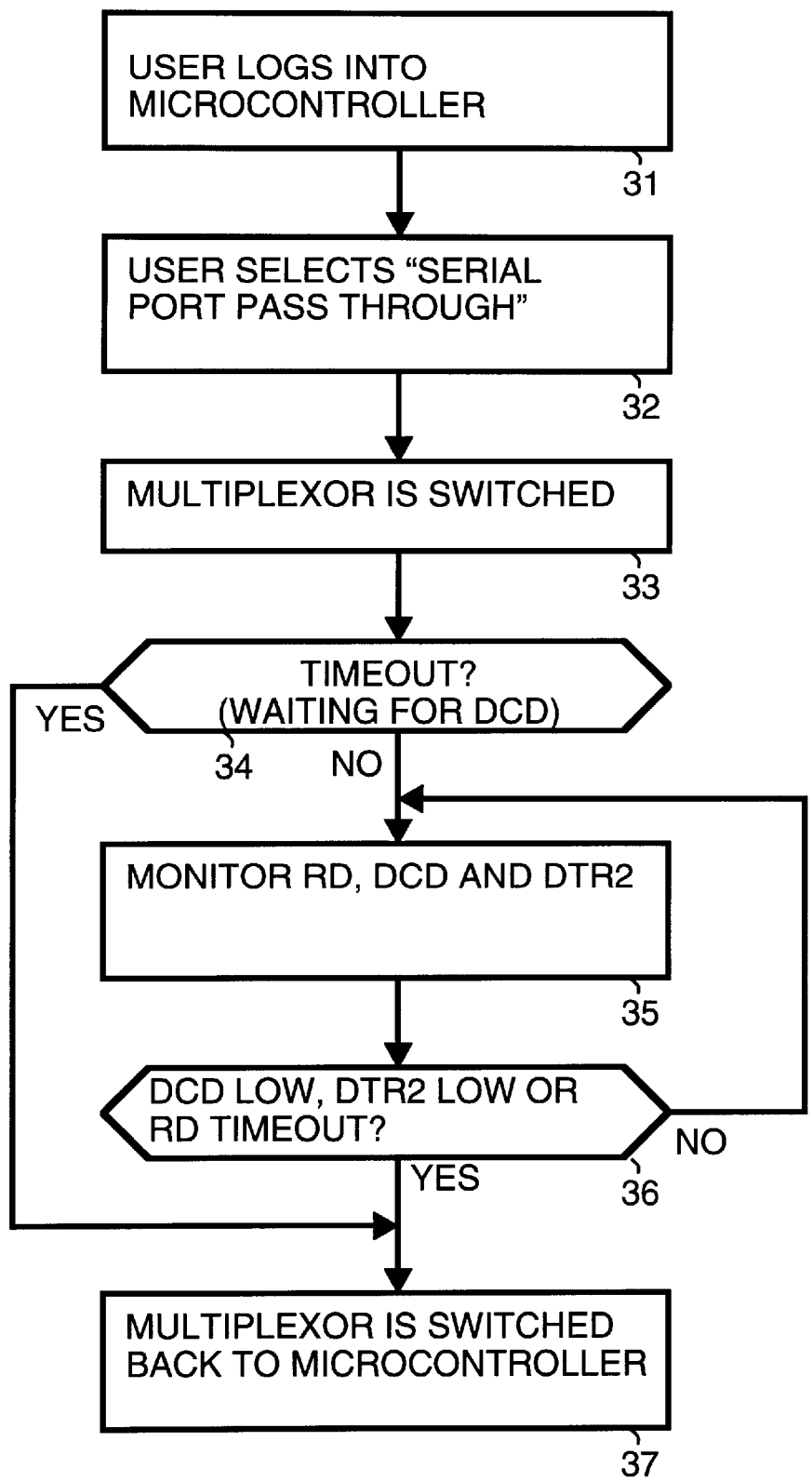
FIG. 2 is a simplified flowchart which illustrates switching function for the single serial port shown in FIG. 1 in accordance with a preferred embodiment of the present invention.

FIG. 2 is a simplified flowchart which illustrates how control logic 11 controls the switching of multiplexer 16. In a step 31, when a user calls in through modem 18 and serial port connector 17, multiplexer 16, by default, connects serial port connector to UART 13 and control logic 11. Microcontroller 12 handles the user log in.

As illustrated by a step 32, once the user is logged in, the user can select a "serial port pass through" mode. When the user selects the "serial port pass through" mode, in a step 33, control logic 11 asserts MUXCTL line 25 causing multiplexer 16 to connect UART 15 to serial port connector.

The host application can then utilize serial port connector 17 through UART 15 to communicate with the user (client) software. The host application can be implemented, for example, using remote access software such as Remote Access Service software available from Microsoft Corporation, having a business address at 16011 NE 36th Way, Redmond, Wash. 98073-9717.

In order to provide for a smooth hand-off to the host application, the host application has to set up a direct-connection which has the same serial connections (e.g., baud rate, parity and flow control) as used by microcontroller 12. The host application is configured to launch at startup and waits for DCD to be asserted. Thus the host application will always be waiting for a connection.

In a step 34, control logic 11 waits one minute for connection to be made. Control logic 11 monitors DCD line 26 to determine whether a connection is made. When the signal on DCD line 26 is asserted, this indicates that a connection has been made. If the signal on DCD line 26 is not asserted within one minute, a time-out has occurred.

If in step 34, a time-out has occurred, control logic proceeds to a step 37. If, in step 34, a connection is made before there is a time-out, in a step 35, the host application establishes a connection with the client application. In the preferred embodiment, the client application is able to switch between remote management application (run on microcontroller 12)) and remote access application (the host application running on CPU 30) without dropping the connection to modem 18. Control logic 11 continues to monitor the connection between serial port connector 17 and UART 15 to detect when a disconnect has occurred.

Particularly, when the signal on DTR2 line is pulled low this indicates that the host application is disconnecting modem 18. When the host application is disconnecting, UART 15 will drop DTR2 low a minimum of 50 microseconds. This transition will be latched by control logic 11 in order to detect this transition. When DCD goes low, this indicates modem 18 has lost carrier. If there is no activity on the RD line for a configured "autologout" period (e.g. five minutes) from serial port connector 17, this indicates that the client application is hung.

In a step 36, control logic 11 determines there is a disconnection when DTR2 pulses low, DCD goes low, or there has been no activity on RD for the autologout period. As long as none of these occur, control logic continues, in step 35, to monitor RD, DCD and DTR2.

If in step 36, DTR2 pulses low, DCD goes low, or there is no activity on RD for the autologout period, in a step 37, control logic 11 switches multiplexer 16 so that UART 13 is re-connected to serial port connector.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for sharing a serial port between a microcontroller and a host application running on a processing unit, comprising the following steps:
    (a) using the microcontroller to initially respond to a remote user making connection to the serial port;
    (b) upon the remote user requesting connection to the host application, making a switch so that a connection is established between the remote user and the host application through the serial port;
    (c) monitoring the connection between the remote user and the host application; and,
    (d) when the connection between the remote user and the host application is discontinued connecting the serial port to the microcontroller.

2. A method as in claim 1 wherein in step (b) the switching is accomplished using a multiplexer.

3. A method as in claim 1 wherein in step (c) the monitoring is performed by control logic separate from the microcontroller.

4. A method as in claim 1 wherein the serial port is RS-232 compatible and in step (c) the connection is monitored by monitoring a data carrier detect line (DCD), a data terminal ready line (DTR) and a receive data line (RD) of the serial port.

5. A method as in claim 1 wherein the host application is remote access software running on a network server.

6. A computing system comprising:
    a serial port connector;
    a microcontroller;
    a host application which runs on a processing unit of the computing system;
    serial port hardware, which the host application uses for communication; and
    a switch which connects the serial port connector to either the microcontroller or the serial port hardware, wherein:
        the switch initially connects the microcontroller to the serial port connector so that the microcontroller initially responds to a remote user making connection the serial port connector,
        the switch connects the serial port hardware to the serial port connector upon the remote user requesting connection to the host application, and
        the switch re-connecting the serial port to the microcontroller when a connection between the remote user and the host application is discontinued.

7. A computing system as in claim 6 wherein in the switch comprises a multiplexer.

8. A computing system as in claim 6 additionally comprising: control logic which controls the switch.

9. A computing system as in claim 8 wherein the serial port connector is RS-232 compatible.

10. A computing system as in claim 6 additionally comprising:

control logic which controls the switch;

wherein the serial port connector is RS-232 compatible and the control logic detects the connection between the remote user and the host application is discontinued by monitoring a data carrier detect line (DCD), a data terminal ready line (DTR) and a receive data line (RD) from the serial port connector.

11. A computing system as in claim 6 wherein the host application is remote access software.

12. A computing system as in claim 6 wherein the serial port hardware is a Universal Asynchronous Receiver Transmitter (UART).

13. A computing system as in claim 6 wherein the microcontroller includes a Universal Asynchronous Receiver Transmitter (UART).

14. A device for allowing a serial port connector to be shared, comprising:

a switch which connects the serial port connector to either a microcontroller or a through a serial port hardware to a host application running on a processing unit of a computing system; and, control logic for controlling the switch, wherein in response to the control logic, the switch initially connects the microcontroller to the serial port connector so that the microcontroller initially responds to a remote user making connection the serial port connector, the switch connecting the serial port hardware to the serial port connector upon the remote user requesting connection to the host application, and the switch re-connecting the serial port connector to the microcontroller when a connection between the remote user and the host application is discontinued.

15. A device as in claim 14 wherein in the switch comprises a multiplexer.

16. A device as in claim 14 wherein the serial port connector is RS-232 compatible.

17. A device as in claim 14 additionally comprising:

control logic which controls the switch;

wherein the serial port connector is RS-232 compatible and the control logic detects the connection between the remote user and the host application is discontinued by monitoring a data carrier detect line (DCD), a data terminal ready line (DTR) and a receive data line (RD) from the serial port connector.

18. A device as in claim 14 wherein the host application is remote access software.

19. A device as in claim 14 wherein the serial port hardware is a Universal Asynchronous Receiver Transmitter (UART).

20. A device as in claim 14 wherein the microcontroller includes a Universal Asynchronous Receiver Transmitter (UART).

* * * * *